US008064835B2

(12) United States Patent
Rezvani et al.

(10) Patent No.: US 8,064,835 B2
(45) Date of Patent: Nov. 22, 2011

(54) ANTENNA ASSIGNMENT SYSTEM AND METHOD

(75) Inventors: Behrooz Rezvani, San Ramon, CA (US); Andrea Goldsmith, Menlo Park, CA (US)

(73) Assignee: Quantenna Communications, Inc., Fremont, CA (US)

( * ) Notice: Subject to any disclaimer, the term of this patent is extended or adjusted under 35 U.S.C. 154(b) by 707 days.

(21) Appl. No.: 11/653,135

(22) Filed: Jan. 11, 2007

(65) Prior Publication Data

US 2007/0178839 A1 Aug. 2, 2007

Related U.S. Application Data

(60) Provisional application No. 60/758,466, filed on Jan. 11, 2006.

(51) Int. Cl.
*H04B 15/00* (2006.01)

(52) U.S. Cl. ........................ 455/62; 455/63.4; 455/552.1

(58) Field of Classification Search .................. 455/62, 455/552.1, 63.4, 39, 562.1; 370/330
See application file for complete search history.

(56) References Cited

U.S. PATENT DOCUMENTS

| | | | |
|---|---|---|---|
| 5,268,695 A | 12/1993 | Dentinger et al. | |
| 5,729,558 A | 3/1998 | Mobin | |
| 6,035,007 A | 3/2000 | Khayrallah et al. | |
| 6,081,700 A | 6/2000 | Salvi et al. | |
| 6,351,499 B1 * | 2/2002 | Paulraj et al. ................. | 375/267 |
| 6,470,047 B1 | 10/2002 | Kleinerman et al. | |
| 6,477,208 B1 | 11/2002 | Huff | |
| 6,477,213 B1 | 11/2002 | Miyoshi et al. | |
| 6,484,285 B1 | 11/2002 | Dent | |
| 6,642,904 B2 | 11/2003 | Yokoshima et al. | |
| 6,807,404 B2 | 10/2004 | Meijer | |
| 6,967,598 B2 | 11/2005 | Mills | |
| 7,035,343 B2 | 4/2006 | Chi et al. | |
| 7,058,422 B2 | 6/2006 | Learned et al. | |
| 7,076,263 B2 * | 7/2006 | Medvedev et al. ............. | 455/522 |
| 7,194,237 B2 * | 3/2007 | Sugar et al. ..................... | 455/39 |
| 7,224,743 B2 | 5/2007 | Holmes et al. | |
| 7,298,798 B1 | 11/2007 | Chao et al. | |
| 7,321,636 B2 * | 1/2008 | Harel et al. ................... | 375/299 |
| 7,400,872 B2 | 7/2008 | Kogure | |
| 7,450,657 B2 * | 11/2008 | Paulraj et al. ................. | 375/267 |

(Continued)

FOREIGN PATENT DOCUMENTS

WO    WO-2007021159 A2    2/2007

(Continued)

OTHER PUBLICATIONS

Ratfai et al, IEEE Custom Integrated Circuit Conference, p. 41-1:357-361 (2005).

(Continued)

*Primary Examiner* — Jean Gelin
*Assistant Examiner* — Nathan Taylor
(74) *Attorney, Agent, or Firm* — Sheppard Mullin Richter & Hampton LLP (57) ABSTRACT

This specification describes, in part, a technique for dynamic assignment of multiple antennas to different radio subsystems in a wireless device. The technique may include using an adaptive algorithm to allocate antennas to different radio subsystems as a function of, for example, application requirements, power requirements, and/or channel/network conditions. The specification also describes, in part, a technique for adaptively optimizing the use of the assigned antennas and other transmission parameters for each radio subsystem.

28 Claims, 7 Drawing Sheets

U.S. PATENT DOCUMENTS

| | | | |
|---|---|---|---|
| 7,564,931 B2 | 7/2009 | Venkataramani et al. | |
| 7,623,836 B1 | 11/2009 | Finkelstein | |
| 2002/0163879 A1* | 11/2002 | Li et al. | 370/200 |
| 2003/0003863 A1* | 1/2003 | Thielecke et al. | 455/39 |
| 2003/0081701 A1 | 5/2003 | Pick et al. | |
| 2003/0087673 A1* | 5/2003 | Walton et al. | 455/562 |
| 2003/0141938 A1 | 7/2003 | Poklemba et al. | |
| 2003/0157954 A1* | 8/2003 | Medvedev et al. | 455/522 |
| 2003/0185309 A1* | 10/2003 | Pautler et al. | 375/257 |
| 2004/0013209 A1 | 1/2004 | Zehavi et al. | |
| 2004/0234012 A1 | 11/2004 | Rooyen | |
| 2004/0240486 A1 | 12/2004 | Venkatesh et al. | |
| 2005/0053172 A1 | 3/2005 | Heikkila | |
| 2005/0085269 A1* | 4/2005 | Buljore et al. | 455/562.1 |
| 2005/0099937 A1* | 5/2005 | Oh et al. | 370/207 |
| 2005/0113041 A1* | 5/2005 | Polley et al. | 455/105 |
| 2005/0130694 A1* | 6/2005 | Medvedev et al. | 455/522 |
| 2005/0170839 A1* | 8/2005 | Rinne et al. | 455/446 |
| 2005/0192019 A1* | 9/2005 | Kim et al. | 455/452.1 |
| 2005/0195784 A1* | 9/2005 | Freedman et al. | 370/338 |
| 2005/0220057 A1 | 10/2005 | Monsen | |
| 2005/0245201 A1* | 11/2005 | Ella et al. | 455/78 |
| 2005/0265470 A1* | 12/2005 | Kishigami et al. | 375/267 |
| 2005/0276361 A1 | 12/2005 | Kim et al. | |
| 2006/0034217 A1* | 2/2006 | Kwon et al. | 370/328 |
| 2006/0034221 A1* | 2/2006 | Karaoguz et al. | 370/330 |
| 2006/0083290 A1 | 4/2006 | Shin et al. | |
| 2006/0223487 A1* | 10/2006 | Alam et al. | 455/344 |
| 2006/0270427 A1* | 11/2006 | Shida et al. | 455/512 |
| 2006/0276227 A1* | 12/2006 | Dravida | 455/562.1 |
| 2007/0136446 A1* | 6/2007 | Rezvani et al. | 709/219 |
| 2007/0153924 A1 | 7/2007 | Ling et al. | |
| 2007/0202818 A1* | 8/2007 | Okamoto | 455/101 |
| 2007/0258534 A1 | 11/2007 | Schmidt | |
| 2008/0139123 A1 | 6/2008 | Lee et al. | |

FOREIGN PATENT DOCUMENTS

| | | |
|---|---|---|
| WO | WO-2007130578 A2 | 11/2007 |

OTHER PUBLICATIONS

Ratfai et al, IEEE Journal of Solid State Circuits, 42(6); 1291-1299 (2007).

International Search Report, PCT/US07/10845, (Jul. 28, 2008).
Co-pending U.S. Appl. No. 11/800,357, filed May 4, 2007.
Co-pending U.S. Appl. No. 11/800,378, filed May 4, 2007.
Co-pending U.S. Appl. No. 11/872,700, filed Oct. 15, 2007.
Co-pending U.S. Appl. No. 12/288,569, filed Oct. 20, 2008.
Co-pending U.S. Appl. No. 12/299,470, filed Mar. 19, 2009.
Giallorenzi et al., "Noncoherent Sequence Demodulation for Trellis Coded M-DPSK", Military Communications Conference, 1991, MILCOM '91. Conference Record, Military Communication in a Changing World, IEEE, vol. 3, Nov. 1991, pp. 1023-1027.
Hong et al., "Detection of Amplitude-Phase Modulated Signals Over Frequency Nonselective Rayleigh Fading Channels with Adaptive Symbol-Aided Channel Estimation", 1996, Vehicular Technology Conference, 1996, Mobile Technology for the Human Race, IEEE 46th, vol. 2, pp. 983-987.
International Search Report of PCT/US07/10845 dated Jul. 28, 2008, pp. 1-3.
International Search Report of PCT/US2008/011965 dated Mar. 25, 2009, pp. 1-3.
Non-Final Office Action Mailed Aug. 5, 2010, in Co-Pending U.S. Appl. No. 11/872,700, filed Oct. 15, 2007.
Non-Final Office Action Mailed May 4, 2010 in Co-pending U.S. Appl. No. 11/800,357, filed May 4, 2007.
Written Opinion of PCT/US07/10845 dated Jul. 28, 2008, pp. 1-7.
Written Opinion of PCT/US2008/011965 dated Mar. 25, 2009, pp. 1-6.
Office Action mailed Dec. 7, 2010 from U.S. Appl. No. 11/800,378, filed May 4, 2007.
Notice of Allowance mailed Mar. 17, 2011 from U.S. Appl. No. 11/800,378, filed May 4, 2007.
Office Action maield Jan. 26, 2011 from U.S. Appl. No. 12/299,470, filed Mar. 19, 2009.
Office Action mailed Feb. 15, 2011 from U.S. Appl. No. 11/872,700, filed Oct. 15, 2007.
Notice of Allowance mailed May 23, 2011 from U.S. Appl. No. 11/872,700, filed Oct. 15, 2007.
Office Action mailed Dec. 22, 2010 from U.S. Appl. No. 11/800,357, filed May 4, 2007.
Notice of Allowance dated May 12, 2011 from U.S. Appl. No. 11/800,357, filed May 4, 2007.

* cited by examiner

ANTENNA ASSIGNMENT SYSTEM AND METHOD

CROSS-REFERENCE TO RELATED APPLICATIONS

The present application claims priority to U.S. Provisional Patent Application No. 60/758,466, filed on Jan. 11, 2006, and which is incorporated herein by reference.

BACKGROUND

The invention relates to wireless transceivers, and more specifically to wireless transceivers with multiple radio subsystems and multiple antennas.

Many wireless devices support multiple wireless systems and/or standards. For example, many cellular handsets support cellular communication via one or more of the cellular phone standards and also support Bluetooth radio communication. Similarly, many wireless LAN radio cards support the 802.11b, 802.11g, and/or 802.11n standard in the 2.4 GHz radio band as well as the 802.11a and/or 802.11n standard in the 5 GHz band. Radio signals transmitted and received through such multimode devices are transmitted and received through one or more antennas on the device.

Typically, the allocation of antennas to a particular radio subsystem is static. It would be advantageous to be able to allocate antennas dynamically.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

In an illustrative embodiment, a method may include repeating until the number of spatial streams is greater than a maximum number of spatial streams: optimizing use of antennas to support the number of spatial streams, optimizing transmission parameters, determining throughput for the number of spatial streams and the optimized transmission parameters, storing the number of spatial streams and optimized transmission parameters as optimal—and throughput as maximum throughput—if throughput is higher than a prior maximum throughput, and incrementing the number of spatial streams. The method may further include initializing a number of spatial streams to a starting value.

In an alternative illustrative embodiment, a method may include assigning a minimum number of antennas to each of a plurality of operational radio subsystems; assigning additional antennas to meet minimum performance criteria for first one or more operational radio subsystems of the plurality of operational radio subsystems; and assigning remaining antennas, if any, to second one or more operational radio subsystems of the plurality of operational radio subsystems.

An example of a wireless device constructed according to techniques described herein may include a plurality of antennas; a plurality of radio subsystems; and an antenna multiplexer dynamically coupling subsets of the plurality of antennas to one or more of the radio subsystems in accordance with a switching algorithm embodied in a computer-readable medium. The radio subsystems may operate using any known or convenient wireless standard, including by way of example but not limitation, Bluetooth, UWB, 802.11a, 802.11b, 802.11g, 802.11n, GSM, EDGE, Wideband CDMA, CDMA2000, WIMAX, or some other wireless technology.

BRIEF DESCRIPTION OF THE DRAWINGS

Embodiments of the inventions are illustrated in the figures. However, the embodiments and figures are illustrative rather than limiting; they provide examples of the invention.

DETAILED DESCRIPTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

In one aspect, multiple antennas in a given wireless device consisting of one or more radio subsystems can be used by the subsystem(s) to increase data rates through spatial multiplexing, increase link robustness through antenna diversity, steer the antenna beam in a given direction to increase directional gain and/or reduce interference, and for a combination of these benefits. A wireless device with one or more radio subsystems and multiple antennas can use the antennas adaptively in the manner that best meets the system's performance objectives given the application performance requirements of the different radio subsystems, channel conditions, interference conditions, and the ability to adapt the assignment of antennas to subsystems as well as various transmission parameters of each subsystem such as transmit power, constellation size, modulation type, channel coding scheme and/or rate, and frame length. Performance requirements for the subsystems may include specifications related to raw data rate, throughput, bit and/or packet error probability, average delay, and/or delay jitter as well as specifications related to system power consumption. In an illustrative embodiment, only a subset of the total number of antennas available to one or more of the radio subsystems may be used to conserve system power.

Suppose an optimization criterion for a radio system with multiple antennas is to maximize its total throughput T. This total system throughput is a function of how many spatial streams are transmitted ($N_s$), the raw physical layer data rate $R_i$ on each stream, and the probability of packet (or bit) error $P_i$ on each stream (this assumes for simplicity that the CRC checksum with an overhead of C symbols per packet consumes negligible rate. The overhead of the CRC is taken into account in the throughput equation below by including a multiplicative factor (L-C)/L, where L is the packet length in symbols). Specifically, the throughput is given by:

$$T = \sum_{i=1}^{N_s} R_i(1 - P_i)$$

The $i^{th}$ stream's data rate is a function of its constellation size ($M_i$) and code rate ($C_i$), and the packet or bit error rate is a function of these parameters as well as the type of modulation and coding and the signal to interference plus noise ratio (SINR), $\gamma_i$, on the $i^{th}$ stream, i.e. $P_i = f(M_i, C_i, \gamma_i)$ where the function f( ) depends on the modulation and coding used for the transmission and the nature of the interference, which is typically modeled as additional Gaussian noise. In general, both $P_i$ and $R_i$ decrease with code rate and increase with constellation size. In addition, $P_i$ decreases with the $i^{th}$ stream's SINR $\gamma_i$. This SINR is a function of the matrix of channel gains between all transmit and receive antennas and the interference power (in the absence of interference it is proportional to the square of the $i^{th}$ singular value of the channel gain matrix), and this SINR generally decreases as the number of spatial streams $N_s$ increases, since fewer spatial streams imply that fewer antennas are required for spatial multiplexing, and thus more antennas are available for diversity combining and/or interference cancellation/reduction, which increases SINR.

Based on these relationships, we see that there is a (possibly non-unique) optimal set of the parameters ($M_i$, $C_i$, $N_s$) that can be selected for transmission to maximize throughput T. This optimal set will depend on channel conditions (the matrix of channel gains and the interference power and direction) and the modulation and coding schemes available. These parameters can be updated each time channel conditions change to optimize performance over time.

Figure 1:
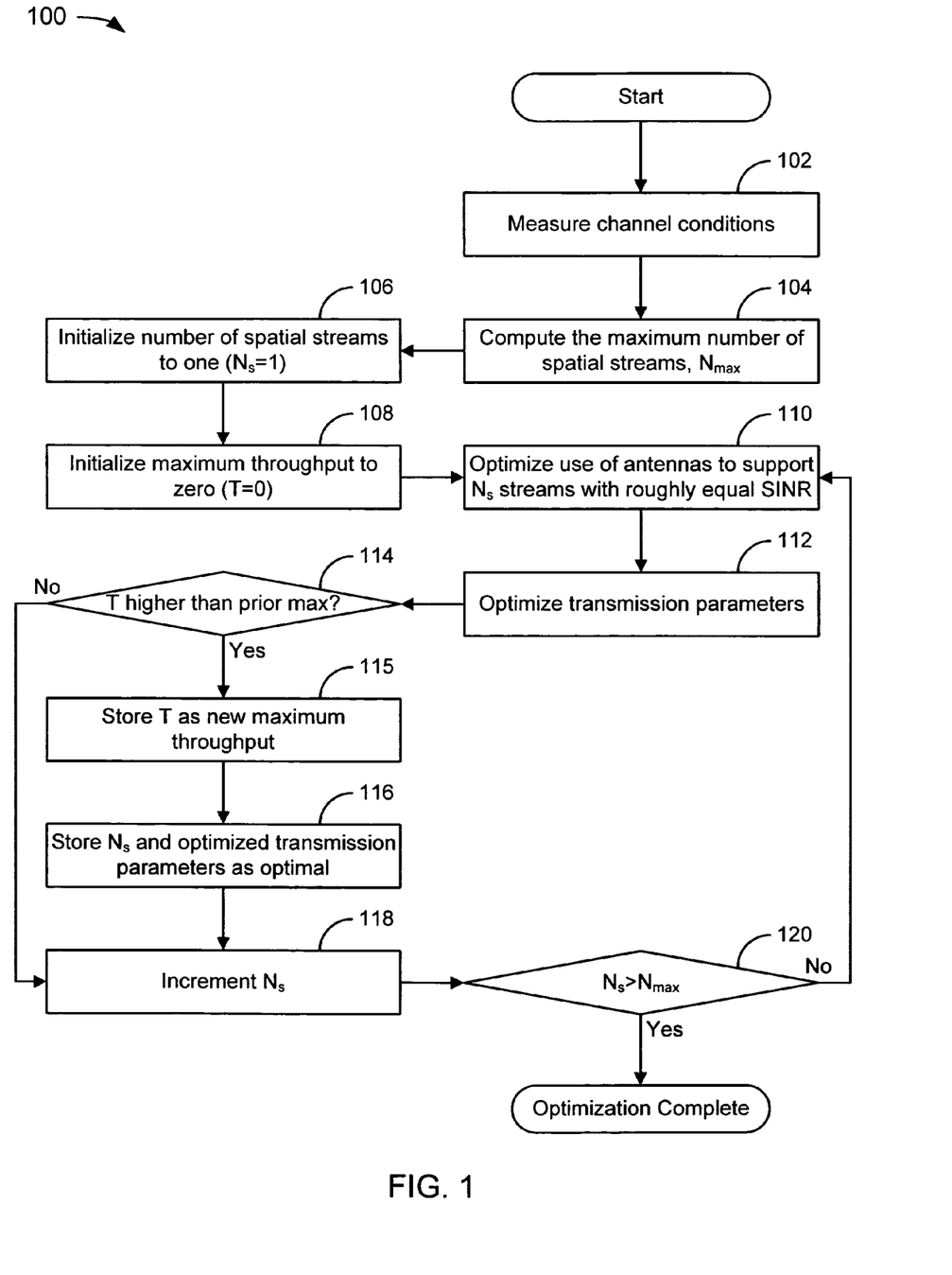
FIG. 1 depicts a flowchart of an example of a method for optimization of antenna use and transmission parameters in a radio with multiple antennas for each channel condition measurement.

FIG. 1 depicts a flowchart 100 of an example of a method for optimization of antenna use and transmission parameters in a radio with multiple antennas for each channel condition measurement. This method and other methods are depicted as serially arranged modules. However, modules of the methods may be reordered, or arranged for parallel execution as appropriate. In an illustrative embodiment similar optimization can be applied to other performance objectives that include requirements for some combination of raw data rate, throughput, bit/packet error probability, average delay, delay jitter, or any other system performance parameters such as power consumption or application requirements (e.g. target video distortion). Most wireless systems use data retransmission for packets received in error: For such systems the retransmissions may be a significant source of delay, but this delay and the associated performance requirements or constraints can be included in the optimization algorithm if delay is part of the performance objective.

In the example of FIG. 1, the flowchart 100 begins at module 102 where channel conditions are measured. This may involve, by way of example but not limitation, determining a channel gain matrix, measuring interference, or measuring some other channel condition.

In the example of FIG. 1, the flowchart 100 continues to module 104 where the maximum number $N_{max}$ of spatial streams that the multiple antennas can support given the channel measurements is computed. This may involve, by way of example but not limitation, computing the rank of the channel gain matrix.

In the example of FIG. 1, the flowchart 100 continues to module 106 where the number of spatial streams, $N_s$, is initialized to one ($N_s$=1) and to module 108 where the maximum throughput is initialized to zero (T=0).

In the example of FIG. 1, the flowchart 100 continues to module 110 where the use of the antennas is optimized to support $N_s$ streams with roughly equal SINR per stream. This equalization of SINRs per stream is not limiting, and different data priorities may entail assigning higher SINRs to higher priority data streams and lower SINRs to lower priority data streams.

In the example of FIG. 1, the flowchart 100 continues to module 112 where transmission parameters are optimized. Optimizing transmission parameters may have the effect of maximizing throughput, T. In an illustrative embodiment, T may be maximized by optimizing parameters $M_i$ and $C_i$ for each of the $N_s$ streams, given their SINR.

In the example of FIG. 1, the flowchart 100 continues to decision point 114 where it is determined whether throughput T is higher than a prior maximum. If it is determined that T is higher than a prior maximum (114-Yes), then the flowchart 100 continues to module 115 where T is set as the new maximum throughput, to module 116 where $N_s$ and the optimized transmission parameters are stored as optimal, and to module 118 where $N_s$ is incremented. If, on the other hand, it is determined that T is not higher than a prior maximum (114-No), then the flowchart 100 continues to module 118 where $N_s$ is incremented.

In the example of FIG. 1, the flowchart 100 continues to decision point 120 where it is determined whether $N_s > N_{max}$. If it is determined that $N_s > N_{max}$ (120-Yes), then all possible numbers of spatial streams have been optimized for and thus the optimization is complete. If, on the other hand, it is determined that $N_s \leq N_{max}$ (120-No), then the flowchart 100 returns to module 110 as described previously.

In a radio system consisting of multiple radio subsystems and multiple antennas, in an illustrative embodiment, it is simultaneously determined which system antennas are assigned to each of the radio subsystems as well as the use of the antennas assigned to each radio subsystem. Advantageously, antennas can be adaptively assigned to (one or more) different radio subsystems via an antenna multiplexer, and each radio system can then use its assigned antennas in the best possible manner based on an optimization algorithm (as illustrated in FIG. 1 by way of example but not limitation) to optimize its performance.

Figure 2:
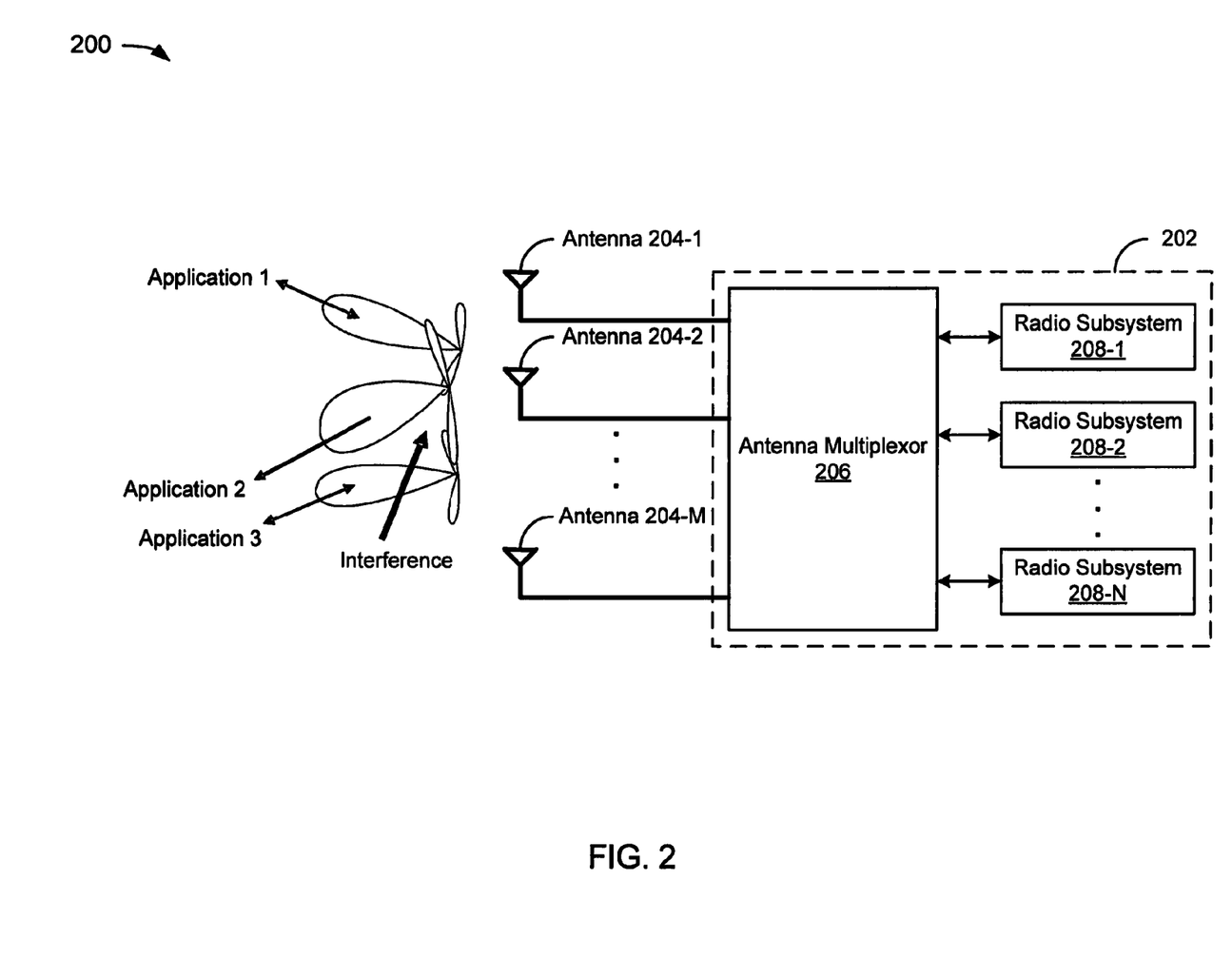
FIG. 2 depicts an example of an antenna multiplexing system.

FIG. 2 depicts an example of an antenna multiplexing system 200. The system 200 includes a multiple antenna device 202 with antennas 204-1 to 204-M (referred to collectively as antennas 204). The multiple antenna device 202 includes an antenna multiplexer 206 coupled to the antennas 204 and to radio subsystems 208-1 to 208-N (referred to collectively as radio subsystems 208). In an illustrative embodiment, the antenna multiplexer 206 uses a bank of switches to connect different antennas to different radio systems, as shown by way of example but not limitation in FIG. 3.

Figure 3:
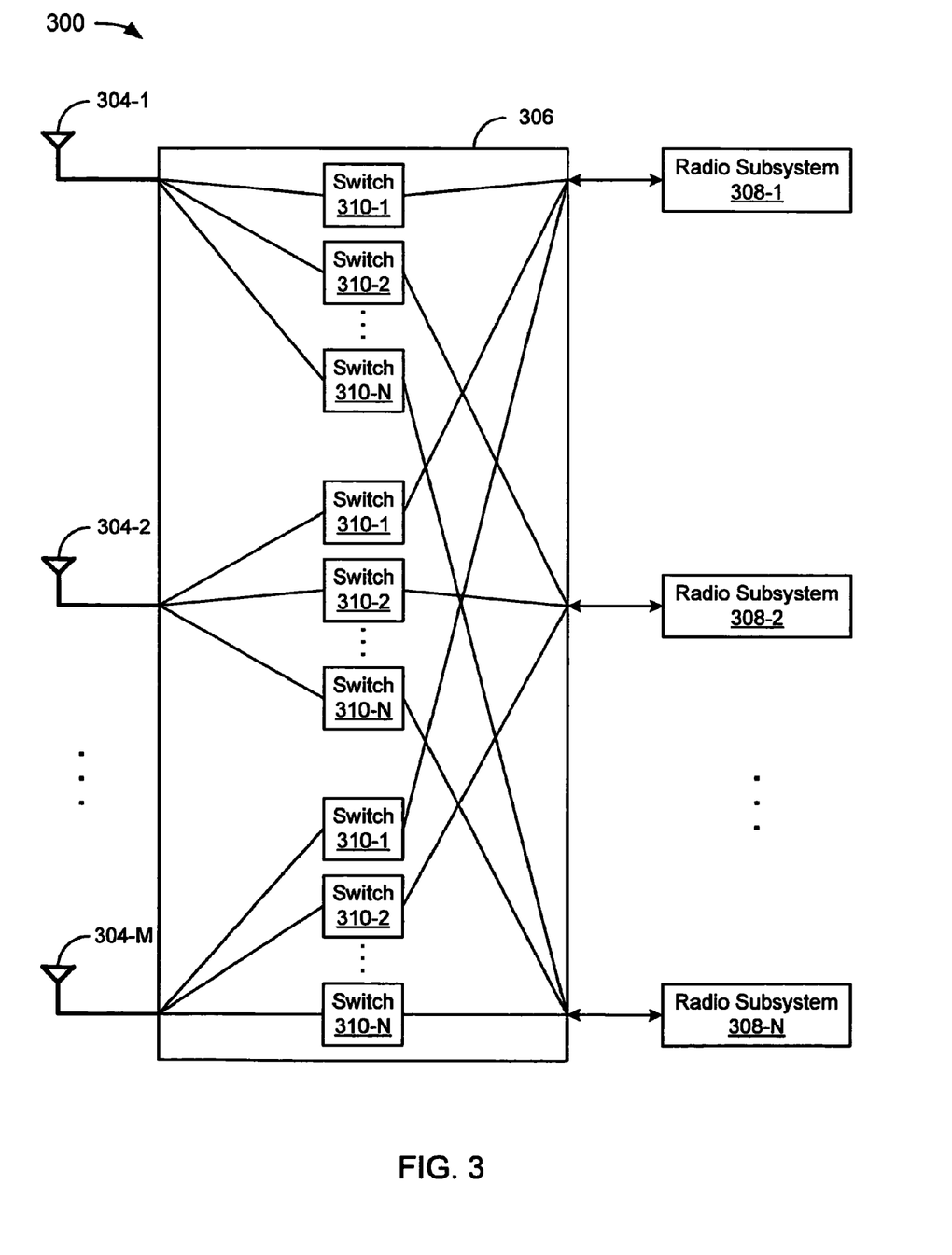
FIG. 3 depicts an example of switches in an antenna multiplexer.

FIG. 3 depicts an example of switches in an antenna multiplexer system 300. The system 300 includes antennas 304-1 to 304-M (referred to collectively as antennas 304), an antenna multiplexer 306, and radio subsystems 308-1 to 308-N (referred to collectively as radio subsystems 308). Each of the antennas 304 is coupled to switches 310-1 to 310-N (referred to collectively as switches 310). Each of the switches 310 is coupled to a respective one of the radio subsystems 308.

If all the radio subsystems 308 operate in the same frequency band then the antennas 304 need only be designed for that band. However, in some embodiments the radio subsystems 308 may operate in different frequency bands. In this case there may be different subsets of antennas 304 that are designated for the different frequency bands, and these subsets are only assigned to the radio subsystems 308 in the appropriate bands. Alternatively, the antennas 304 can be designed to be wideband or multiband so that they can be assigned to any of the radio subsystems 308. A third alternative would be that different subsets of the antennas 304 could support different subsets of radio subsystems 308. For example if the radio subsystems 308 could be divided into subsets with frequencies of operation relatively close, then wideband antennas could be designed to cover each of the radio subsystem subsets.

In a specific implementation, the radio subsystems 308 could include by way of example but not limitation an IEEE 802.11g or IEEE 802.11n compatible radio (in the 2.4 GHz band), an IEEE 802.11a or IEEE 802.11n compatible radio (in the 5 GHz band), and a Bluetooth radio (in the 2.4 GHz band). If the antennas 304 are wideband or multiband across the 2.4 GHz and 5 GHz bands then any antenna could be assigned to any of the radio subsystems 308. However, if some subset of antennas 304 covers the 2.4 GHz band only then these antennas can be assigned to either the 802.11g/n or Bluetooth subsystem, whereas all the antennas in the 5 GHz band would be assigned to the 802.11a/n subsystem.

The antenna multiplexer 306 may use a switching algorithm to control the switches 310. As shown by way of example but not limitation in FIG. 4, a switching algorithm can be embodied in a computer readable medium on an antenna multiplexer. The system of FIG. 4 includes antennas 404-1 to 404-M (referred to collectively as antennas 404), an antenna multiplexer 406, and radio subsystems 408-1 to 408-N (referred to collectively as radio subsystems 408). The antenna multiplexer 406 includes a plurality of switches 410 connecting the antennas 404 to the radio subsystems 408.

Figure 4:
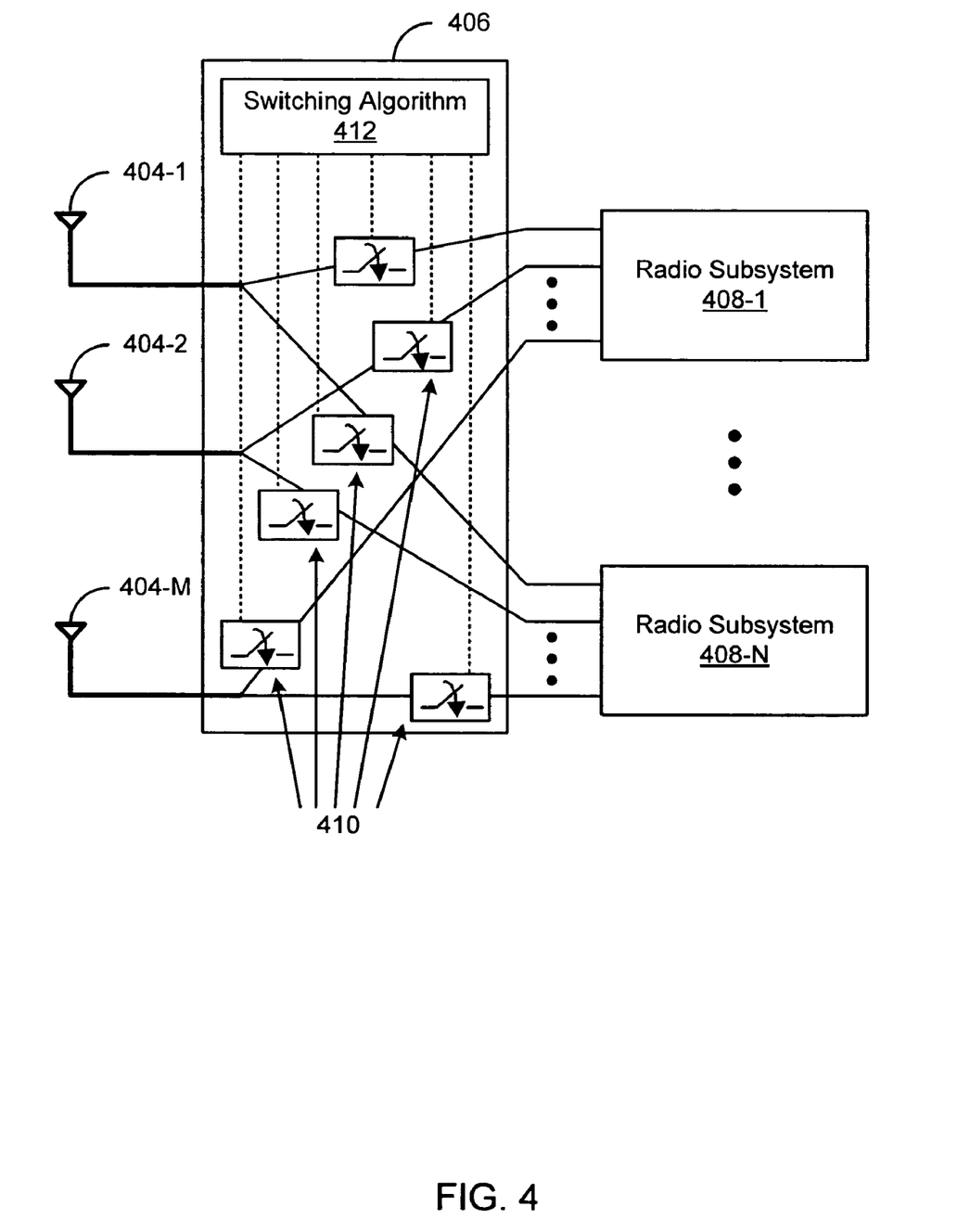
FIG. 4 shows a switching algorithm on an antenna multiplexer.

When the switch connecting a given antenna to a given radio subsystem is closed, the antenna is connected to the radio subsystem; when the switch is open, it is not connected. In a typical embodiment the switching algorithm 412 uses standard techniques to control the switches 410; for example, the switches 410 could be designed so that if the switching algorithm 412 causes switch input to be a high voltage, a switch is open, and if the switching algorithm 412 causes switch input to be a low voltage, the switch is closed. However, other known or convenient techniques may be used to control the switches 410.

The switch algorithm 412 may or may not use information from some or all of the radio subsystems 408 to determine switch control. This input may include but is not limited to subsystem priorities, subsystem requirements such as data rate, throughput, and required link SINR; subsystem conditions such as average packet delay and delay jitter, channel conditions (channel gain and interference characteristics) at each antenna, and system power constraints. The channel gains and interference conditions can be obtained, for example, by a periodic full antenna training of each radio subsystem whereby all antennas that support the frequency band of that subsystem are connected to it.

Figure 5:
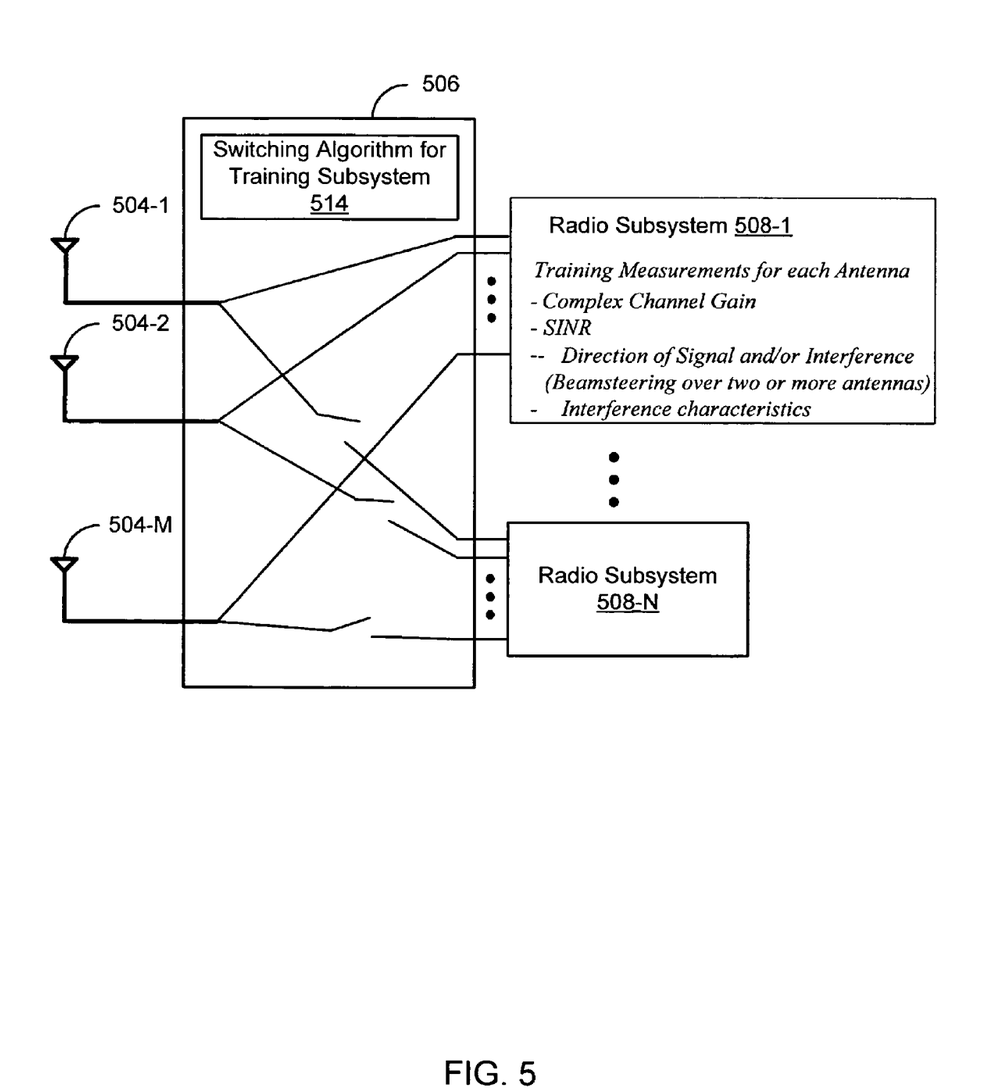
FIG. 5 depicts a conceptual diagram of antenna training for a radio subsystem.

FIG. 5 depicts a conceptual diagram 500 of antenna training for a radio subsystem. The diagram 500 includes antennas 504-1 to 504-M (referred to collectively as antennas 504), an antenna multiplexer 506, and radio subsystems 508-1 to 508-N (referred to collectively as radio subsystems 508). The antenna multiplexer 506 includes a switching algorithm for training a subsystem 514, which, in an illustrative embodiment, is embodied in a computer-readable medium.

For illustrative purposes, the diagram 500 is ready to train the radio subsystem 508-1, in that the antennas 504 are each connected to the radio subsystem 508-1, while the antennas 504 are not coupled to the other radio subsystems 508. As described with reference to FIG. 4 by way of example but not limitation, switches may be used to connect (or not) the antennas 504 to the radio subsystems 508.

During training for the radio subsystem 508-1 the complex channel gain, link SINR and interference power associated with each antenna (e.g., across all its frequencies) can be measured, and the interference and/or signal direction (e.g., across all its frequencies) can also be measured by using beamforming (antenna weighting) across two or more antennas to point the beam associated with the antennas 508 in a given direction, and then measuring the power associated with signals (e.g., desired or interference signals) coming from that direction. In an illustrative embodiment, the training is done for each of the radio subsystems 508 and repeated periodically, where the period of the training can be based on several factors including how often the channel conditions change as well as how often radio subsystem requirements might change.

Note that the radio subsystems 508 may performance partial antenna training, i.e. measure channel conditions on only the antennas assigned to them, more often than full antenna training is performed. This allows each subsystem to adaptively optimize the use of its assigned antennas and the associated transmission parameters, as described by way of example but not limitation with reference to FIG. 1, without impacting other subsystems by requiring all antennas for training.

The method by which the switching algorithm 514 connects antennas to radio subsystems can depend on many different factors, including which of the radio subsystems 508 are in operation (typically none of the antennas 504 will be assigned to a subsystem not in use, although some antennas and their corresponding RF paths may be shut down to save power), channel conditions associated with an antenna, the performance requirements of each subsystem and the applications it is currently running, the priorities associated with different subsystems, and the desired power consumption. In particular, the switching algorithm 514 may not use some subset of the antennas 504 with any radio subsystem in order to conserve power. In addition, subsystems running voice applications may receive priority over subsystems running data applications.

Figure 6:
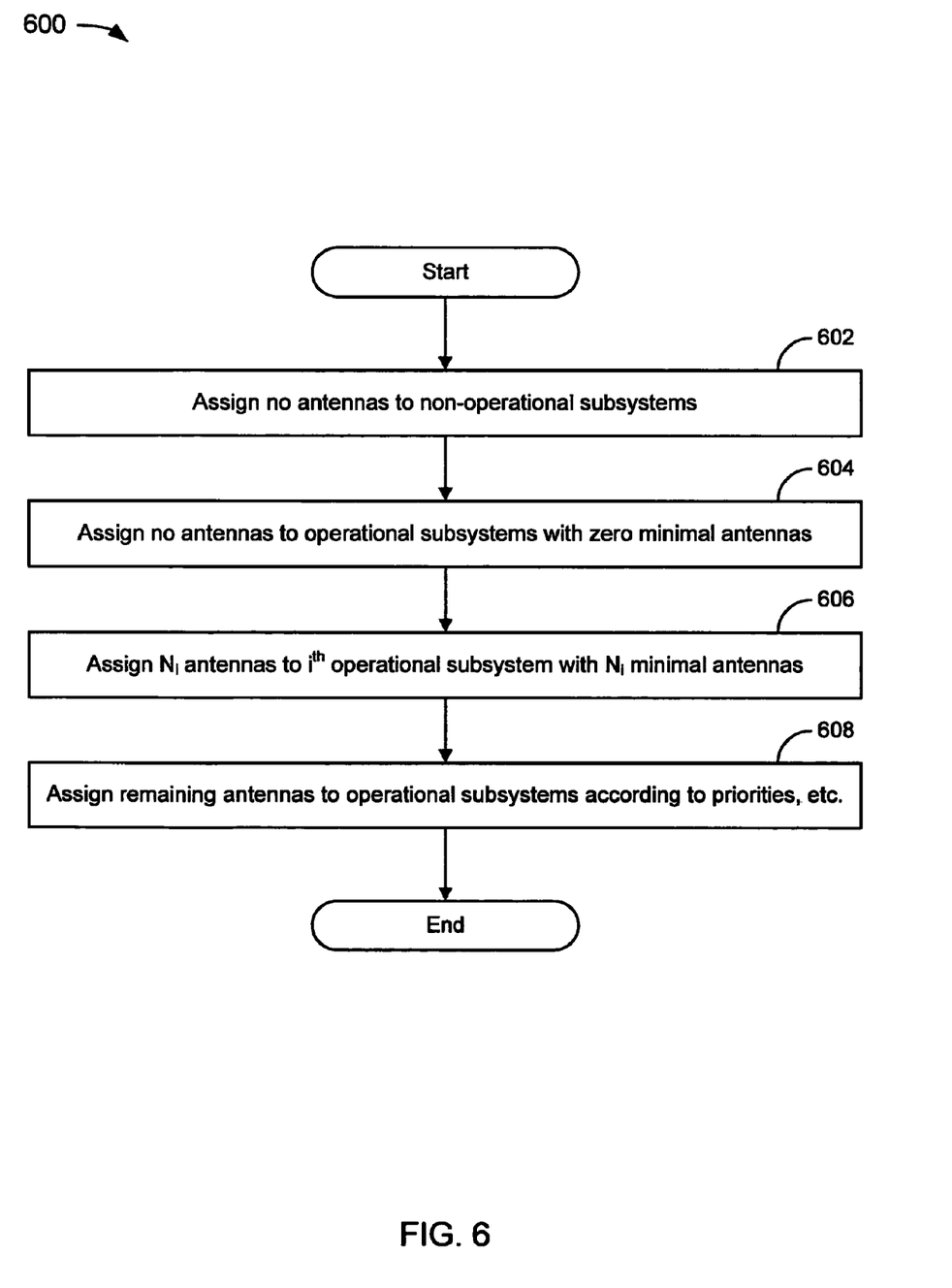
FIG. 6 depicts a flowchart of an example of a method for assignment of radio subsystems.

FIG. 6 depicts a flowchart 600 of an example of a method for assignment of radio subsystems. In the example of FIG. 6, the flowchart 600 starts at module 602 with assigning no antennas to non-operational subsystems. Next the algorithm will assign some minimum number of antennas to each subsystem in operation.

In the example of FIG. 6, the flowchart 600 continues to module 604 where no antennas are assigned to operational subsystems with zero minimal antennas. The minimum number of antennas assigned to the subsystems may be the same (e.g. zero antennas might be assigned to all subsystems) or may be different (e.g. one or more subsystems may be minimally assigned no antennas, but others may be minimally assigned one or more antennas). In an illustrative embodiment, low priority subsystems are assigned zero antennas at least until the other higher priority systems meet their performance requirements.

In the example of FIG. 6, the flowchart 600 continues to module 606 where $N_i$ antennas are assigned to one or more operational subsystems with $N_i$ minimal antennas. $N_i$ has a value of one or more. The minimum number of antennas assigned to the subsystems may be the same (e.g. one antenna might be assigned to all operational subsystems) or may be different (e.g. one or more operational subsystems may be minimally assigned one antenna, but others may be minimally assigned more than one antenna). In an illustrative embodiment, low priority subsystems are assigned zero antennas (e.g., at module 604) at least until higher priority subsystems are assigned one or more antennas (e.g., at module 606). In a specific embodiment, an 802.11n subsystem may be minimally assigned 2, 3, or 4 antennas to be consistent with the standard.

In the example of FIG. 6, the flowchart 600 continues to module 608 where remaining antennas are assigned to operational subsystems according to priorities, channel conditions, requirements, etc. For example, after the minimal assignment is complete, the remaining antennas can be assigned to different subsystems according to an algorithm optimized for the additional assignment. This assignment may take into account the channel conditions associated with each antenna and corresponding radio subsystem, the performance requirements of each subsystem, and/or the priorities associated with different subsystems.

The algorithm to assign remaining antennas after the minimal assignment can be optimized based on a number of different criteria related to performance tradeoffs of subsystems in operation. For example, suppose there are R antennas after the minimal assignment to operational systems is complete (e.g. after modules 602-606). Some number of these R antennas may be assigned to the subsystem with the highest priority until some minimum performance threshold is met, after which the remaining antennas are assigned to the subsystem with the next highest priority until its minimum performance threshold is met, and so forth. The performance threshold is based on some set of desired minimum performance requirements, which may include specifications for raw data rate, throughput, average delay, and/or delay jitter. If there are any remaining antennas after the minimum performance threshold is met for all subsystems then these can remain unused to save power, all be assigned to the highest priority system, divided equally among all systems, or assigned unequally depending on the subsystem priorities and requirements. In particular, some subsystems with the same priority and the same minimal requirements may need more antenna resources to support a particularly demanding application being run at a given time.

Figure 7:
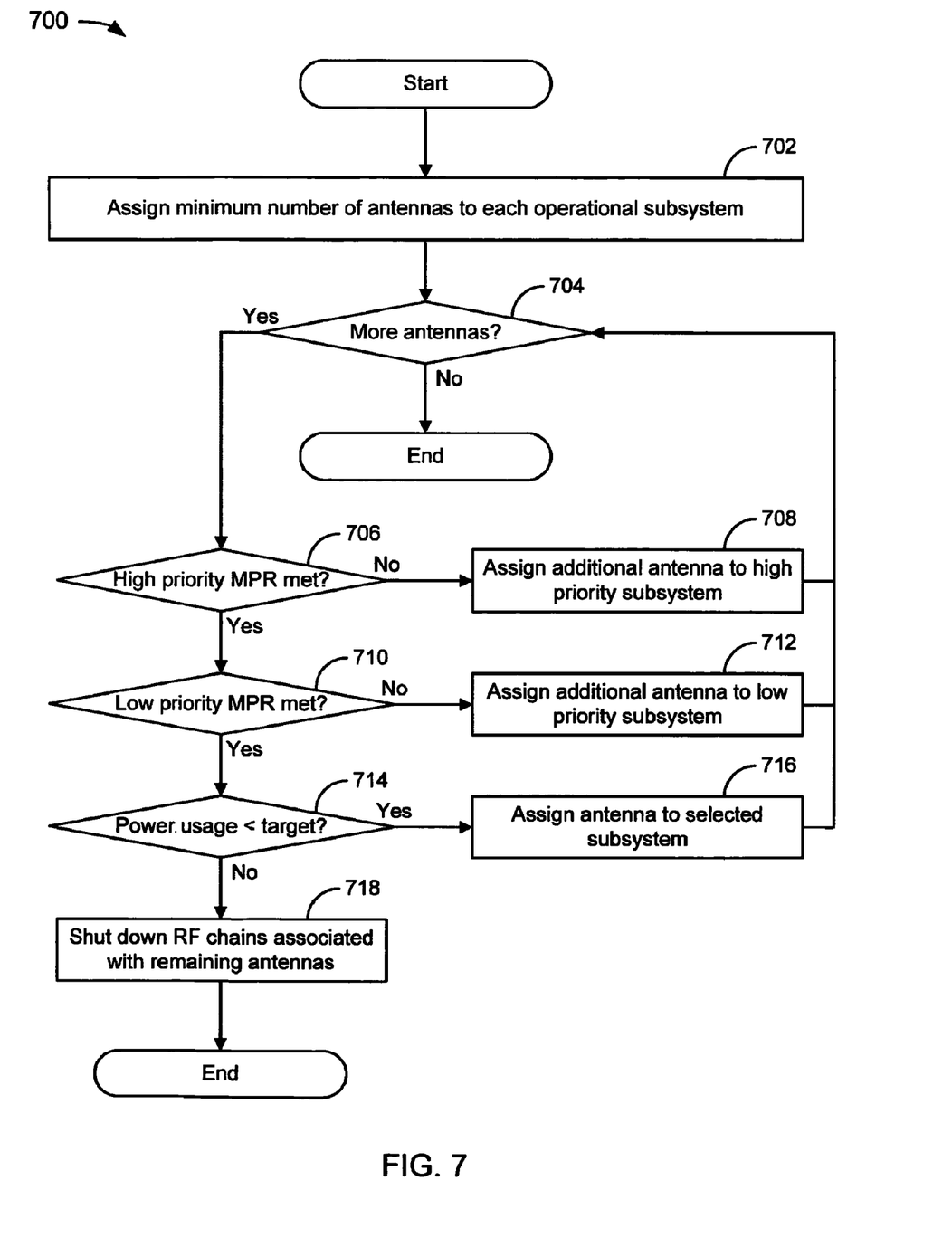
FIG. 7 depicts a flowchart of an example of a method for priority-sensitive antenna assignment.

FIG. 7 depicts a flowchart 700 of an example of a method for priority-sensitive antenna assignment. In the example of FIG. 7, the flowchart 700 starts at module 700 where a minimum number of antennas are assigned to each operational subsystem. The assignment may be based upon priority. For example, assuming two levels of priority for illustrative purposes and defining N as the total number of antennas available, a minimal assignment of $N_1$ antennas may be made to high level subsystems. Then, a minimal assignment of $N_2$ antennas may be made to low level subsystems. This leaves $R=N-N_1-N_2$ antennas for additional assignment.

In an illustrative embodiment, the antennas assigned to a subsystem are used for a combination of spatial multiplexing, diversity, and beamforming such that some number of independent spatial streams are obtained through spatial multiplexing to meet the desired data rate requirements, the link SINR for each of these spatial streams is met through diversity combining of antennas assigned to each spatial stream, any directionality requirements to beamform in the direction of the desired signal or away from an interference signal are met, and/or power consumption is minimized. If there are not sufficient antennas to meet the desired performance requirements of the subsystem then the available antennas are used in the best manner possible to optimize performance of the subsystem.

In the example of FIG. 7, the flowchart 700 continues to decision point 704 where it is determined whether there are additional antennas that may be assigned. In other words, it is determined whether R>0. It may be noted that it is illogical for R to be negative, so a positive (including zero) value is assumed. If it is determined that R=0 (704-No), then the flowchart 700 ends, having assigned all available antennas.

If, on the other hand, it is determined that R>0 (704-Yes), then the flowchart 700 continues to decision point 706 where it is determined whether minimum performance requirements (MPR) are met for a high priority subsystem. If it is determined that MPR is not met for at least one high priority subsystem (706-No), then the flowchart continues to module 708 where an additional antenna is assigned to the high priority subsystem. Although multiple high priority subsystems may be considered, it is assumed that, if necessary, some technique is used to select one of the high priority subsystems for consideration. The technique may be random, predetermined (e.g., using a unique subpriority value), round-robin, or some other known or convenient selection technique. The flowchart 700 then continues to decision point 704, as described previously.

It may be noted that the flowchart 700 loops between decision point 704, decision point 706, and module 708 until either all antennas have been assigned or until MPR is met for all of the high priority subsystems. However, the loops of the flowchart 700 need not correspond to actual steps taken in an implementation. For example, if it is determined that MPR is not met for a high priority subsystem, all of the antennas necessary (assuming the number needed is less than or equal to R) are assigned to the high priority subsystem at once. As another example, if it is determined that MPR is not met for multiple high priority subsystems, each of the high priority subsystems (assuming the number needed is less than or equal to R) are assigned a single antenna with each iteration of the loop 704, 706, 708. As another example, all of the antenna necessary (assuming the number needed is less than or equal to R) are assigned to the high priority subsystems at once.

In an illustrative embodiment, the use of the assigned antennas to a subsystem along with the corresponding transmission parameters (e.g. using an algorithm such as the one illustrated in FIG. 1) are optimized for given performance criteria. If there are not sufficient antennas to meet the desired performance requirements then the algorithm uses all available antennas in the best manner possible to optimize subsystem performance.

Returning once again to decision point 706, if it is determined that high priority MPR are met (706-Yes), then the flowchart 700 continues to decision point 710 where it is determined whether low priority MPR are met for at least one low priority subsystem. If it is determined that low priority MPR are not met for at least one low priority subsystem (710-No), then the flowchart 700 continues to module 712 where an additional antenna is assigned to the low priority subsystem, and to decision point 704, as described previously. The loop 704, 710, 712 continues until all antennas have been assigned or MPR is met for all low priority subsystems. As previously noted, the flowchart 700 assumes two levels or priority, but the technique could be extended to an arbitrary number of priority levels.

At decision point 710, if it is determined that the low priority MPR are met for all low priority subsystems, then the flowchart 700 continues to decision point 714 where it is determined whether power usage for the assigned antennas is below a target. The target may be set prior to the test, or calculated based upon power supply or other considerations on the fly.

If it is determined that power usage is less than the target (714-Yes), then the flowchart 700 continues to module 716 where an antenna is assigned to a selected subsystem, and to decision point 704 as described previously. A selected subsystem may be, for example, a high priority subsystem. However, in an alternative embodiment, a selection algorithm could be used that takes into account considerations in addition to or other than priority.

If, on the other hand, it is determined that power usage is greater than or equal to the target (714-No), then RF chains associated with the remaining antennas are shut down, and the flowchart 700 ends, having assigned all antennas that are to be assigned.

Systems described herein may be implemented on any of many possible computer systems having the same or different architectures. For example, personal computers based on an Intel microprocessor often have multiple buses, one of which can be an I/O bus for peripherals and one that directly connects processor and memory (often referred to as a memory bus). The buses are connected together through bridge components that perform any necessary translation due to differing bus protocols. Network computers are another type of computer system that can be used. Network computers do not usually include a hard disk or other mass storage, and the executable programs are loaded from a network connection into memory. A Web TV system, which is known in the art, is also considered to be a computer system, but it may lack some of the features typical with personal computers, such as certain input or output devices.

An apparatus for performing techniques described herein may be specially constructed for the required purposes, or it may comprise a general purpose computer selectively activated or reconfigured by a computer program stored in the computer. Such a computer program may be stored in a computer readable storage medium, such as, by way of example but not limitation, read-only memories (ROMs), RAMs, EPROMs, EEPROMs, magnetic or optical cards, any type of disk including floppy disks, optical disks, CD-ROMs, DVDs, and magnetic-optical disks, or any known or convenient type of media suitable for storing electronic instructions.

As used herein, algorithmic descriptions within a computer memory are believed to most effectively convey the techniques to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer architecture. The techniques may be implemented using any known or convenient programming language, whether high level (e.g., C/C++) or low level (e.g., assembly language), and whether interpreted (e.g., Perl), compiled (e.g., C/C++), or Just-In-Time (JIT) compiled from bytecode (e.g., Java). Any known or convenient computer, regardless of architecture, should be capable of executing machine code compiled or otherwise assembled from any language into machine code that is compatible with the computer's architecture, including that of embedded systems, if applicable.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

The invention claimed is:

1. A method comprising:
assigning, through an antenna multiplexer coupled between the plurality of antennas and the plurality of operational radio subsystems in the multi-antenna device, a minimum number of antennas of the plurality of antennas to each of the plurality of operational radio subsystems, the plurality of operational radio subsystems being associated with respective plurality of receivers, wherein, before connection of any of the plurality of operational radio subsystems to any of the plurality of antennas, two or more of the plurality of operational radio subsystems in the multi-antenna device are prioritized relative to each other according to a prioritization scheme;
assigning, through the antenna multiplexer, an additional antenna of the plurality of antennas to meet minimum performance criteria between a first operational radio subsystem subsystem of the plurality of operational radio subsystems and a corresponding receiver of the respective plurality of receivers according to the prioritization scheme; and
assigning, through the antenna multiplexer, a remaining antenna of the plurality of antennas to a second operational radio subsystem of the plurality of operational radio subsystems.

2. The method of claim 1, further comprising assigning no antennas to an operational radio subsystem which has a minimum number of antennas of zero.

3. The method of claim 1, further comprising shutting down an RF chain associated with a remaining antenna of the plurality of antennas if power usage is greater than or equal to a target power usage.

4. The method of claim 1, wherein assigning an additional antenna includes:
   first assigning, through the antenna multiplexer, a first additional antenna to a high priority radio subsystem of the plurality of radio subsystems;
   when a second additional antenna is available after said first assigning, second assigning, through the antenna multiplexer, the second additional antenna to a low priority radio subsystem of the plurality of radio subsystems; and
   when a third additional antenna is available after said first assigning and said second assigning, third assigning, through the antenna multiplexer, a third additional antenna to a selected radio subsystem of the plurality of operational radio subsystems when power usage is less than a target power usage.

5. The method of claim 1, wherein said assigning the additional antenna is performed only in response to a determination that the additional antenna is not currently assigned to any of the plurality of radio subsystems.

6. The method of claim 1, further comprising training the one or more of the plurality of radio subsystems to adaptively optimize using the subsets of the plurality of antennas.

7. The method of claim 6, wherein training the one or more of the plurality of radio subsystems comprises:
   measuring a performance characteristic of an antenna of the subsets of the plurality of antennas;
   adapting the one or more of the plurality of radio subsystems to accommodate the performance characteristic of the antenna of the subsets of the plurality of antennas.

8. The method of claim 7, wherein training the one or more of the plurality of radio subsystems comprises measuring a channel gain, a link Signal to Interference Noise Ratio (SINR), and an interference power associated with each antenna of the subsets of the plurality of antennas.

9. A wireless device comprising:
   a plurality of antennas;
   a plurality of radio subsystems which, in operation, are associated with a respective plurality of receivers; and
   an antenna multiplexer dynamically coupling subsets of the plurality of antennas to one or more of the radio subsystems in accordance with a switching algorithm embodied in a computer-readable medium, wherein, before dynamically coupling any of the plurality of antennas to the one or more of the radio subsystems, the switching algorithm applies a prioritization scheme in which two or more of the plurality of operational radio subsystems in the wireless device are prioritized relative to each other, and wherein the switching algorithm includes:
   assigning a minimum number of antennas of the plurality of antennas to each of the plurality of radio subsystems;
   assigning an additional antenna of the plurality of antennas to meet minimum performance criteria between a first subsystem of the plurality of radio subsystems and a corresponding receiver of the respective plurality of receivers according to the prioritization scheme; and
   assigning a remaining antenna of the plurality of antennas to a second subsystem of the plurality of radio subsystems, after assigning the additional antenna;
   wherein the antenna multiplexer is further configured to couple the subsets of the plurality of antennas to the one or more of the radio subsystems.

10. The device of claim 9, wherein the plurality of antennas and wireless subsystems operate in a same frequency band.

11. The device of claim 9, wherein:
   the plurality radio subsystems operate in at least a first frequency band and a second frequency band;
   a first one or more of the plurality of antennas supports the first frequency band; and
   a second one or more of the plurality of antennas supports the second frequency band.

12. The device of claim 11, wherein the first one or more of the plurality of antennas includes the second one or more of the plurality of antennas.

13. The device of claim 9, wherein the switching algorithm adaptively assigns the plurality of antennas relative to performance criteria for the plurality of radio subsystems.

14. The device of claim 13, wherein the performance criteria are selected from the group of criteria consisting of: which subsystems are in operation, channel conditions associated with each antenna, performance requirements of each subsystem and current applications, priorities associated with each of the subsystems, desired power consumption, and a combination of two or more of these criteria.

15. The device of claim 13, wherein the performance criteria include specifications related to criteria selected from the group consisting of: raw data rate, throughput, bit error probability, packet error probability, average delay, average delay jitter, power consumption, and a combination thereof.

16. The device of claim 9, wherein to avoid exceeding a power consumption target, the switching algorithm refrains from assigning one or more of the plurality of antennas to any of the plurality of radio subsystems.

17. The device of claim 9, wherein the plurality of radio subsystems include one or more of the technologies selected from the group of technologies consisting of: Bluetooth, UWB, 802.11a, 802.11b, 802.11g, 802.11n, GSM, EDGE, Wideband CDMA, CDMA2000, WIMAX, and some other wireless technology.

18. The device of claim 9 wherein:
   a first one or more of the plurality of radio subsystems run voice applications;
   a second one or more of the plurality of radio subsystems run data applications; and
   the switching algorithm gives priority to the first one or more of the plurality of radio subsystems.

19. The device of claim 9, wherein multiple radio subsystems of the plurality of radio subsystems are capable of running voice applications and data applications, and wherein the switching algorithm gives a higher priority to one or more of the multiple radio subsystems that are currently running voice applications than it gives to at least one other of the multiple radio subsystems that is not currently running a voice application.

20. The device of claim 9 wherein each of the plurality of radio subsystems optimally adapts use of assigned antennas and associated transmission parameters relative to a set of performance criteria and changing channel conditions.

21. The wireless device of claim 9, wherein said assigning the additional antenna is performed only in response to a determination that the additional antenna is not currently assigned to any of the plurality of radio subsystems.

22. A system comprising:
- means for assigning a minimum number of antennas, of a plurality of antennas of a multi-antenna device, to each of a plurality of operational radio subsystems in the multi-antenna device;
- means for assigning additional antennas to meet minimum performance criteria between first one or more operational radio subsystems of the plurality of operational radio subsystems and respective one or more receivers of a respective plurality of receivers according to a prioritization scheme in which two or more of the plurality of operational radio subsystems in the multi-antenna device are prioritized relative to each other, wherein the prioritization scheme prioritizes the two or more of the plurality of operational radio subsystems before any of the plurality of operational radio subsystems are connected to any of the plurality of antennas; and
- means for assigning remaining antennas, if any, to second one or more operational radio subsystems of the plurality of operational radio subsystems.

23. The system of claim 22, further comprising: means for assigning no antennas to an operational radio subsystems which has a minimum number of antennas of zero.

24. The system of claim 22, further comprising: means for shutting down an RF chain associated with a remaining antenna if power usage is greater than or equal to a target power usage.

25. The system of claim 22, wherein the means for assigning an additional antenna includes:
- means for first assigning a first additional antenna to a high priority radio subsystem;
- means for second assigning a second additional antenna to a low priority radio subsystem if the second additional antenna is available; and
- means for third assigning a third additional antenna to a selected radio subsystem of the plurality of operational radio subsystems if power usage is less than a target power usage.

26. A method comprising:
- initially assigning, to each of a plurality of radio subsystems in a multi-antenna device, one or more antennas of a plurality of antennas of the multi-antenna device, to meet a minimum number of antennas requirement of each of the plurality of radio subsystems; and
- subsequently assigning a first additional antenna, of the plurality of antennas, to a first radio subsystem of the plurality of radio subsystems in the multi-antenna device, according to a prioritization scheme which prioritizes two or more of the plurality of radio subsystems in the multi-antenna device as having different priority levels, wherein the prioritization scheme prioritizes the two or more of the plurality of radio subsystems before any of the plurality of radio subsystems are connected to any of the plurality of antennas.

27. The method of claim 1, wherein said subsequently assigning a first additional antenna comprises assigning the first additional antenna to meet minimum performance criteria of the first radio subsystem.

28. The method of claim 27, further comprising:
- after said subsequently assigning a first additional antenna has been completed, determining whether the plurality of antennas includes an unassigned antenna; and
- in response to a determination that the plurality of antennas includes an unassigned antenna, assigning a second additional antenna, of the plurality of antennas, to a second one of the plurality of radio subsystems in the multi-antenna device, according to the prioritization scheme.

* * * * *